R. Safely,
Stop Cock.

No. 108,522.     Patented Oct. 18, 1870.

Witnesses.
C. Wahlers
E. F. Kastenhuber

Inventor:
Robert Safely
By Van Santvoord & Hauff
his Attys

UNITED STATES PATENT OFFICE.

ROBERT SAFELY, OF COHOES, NEW YORK.

IMPROVEMENT IN STOP-VALVES.

Specification forming part of Letters Patent No. 108,522, dated October 18, 1870; antedated October 15, 1870.

*To all whom it may concern:*

Be it known that I, ROBERT SAFELY, of Cohoes, in the county of Albany, in the State of New York, have invented a new and useful Improvement in Stop-Valves; and I do hereby declare the following to be a full, clear, and exact description thereof, which will enable those skilled in the art to make and use the same, reference being had to the accompanying drawing, forming part of this specification, in which drawing—

Figure 1:
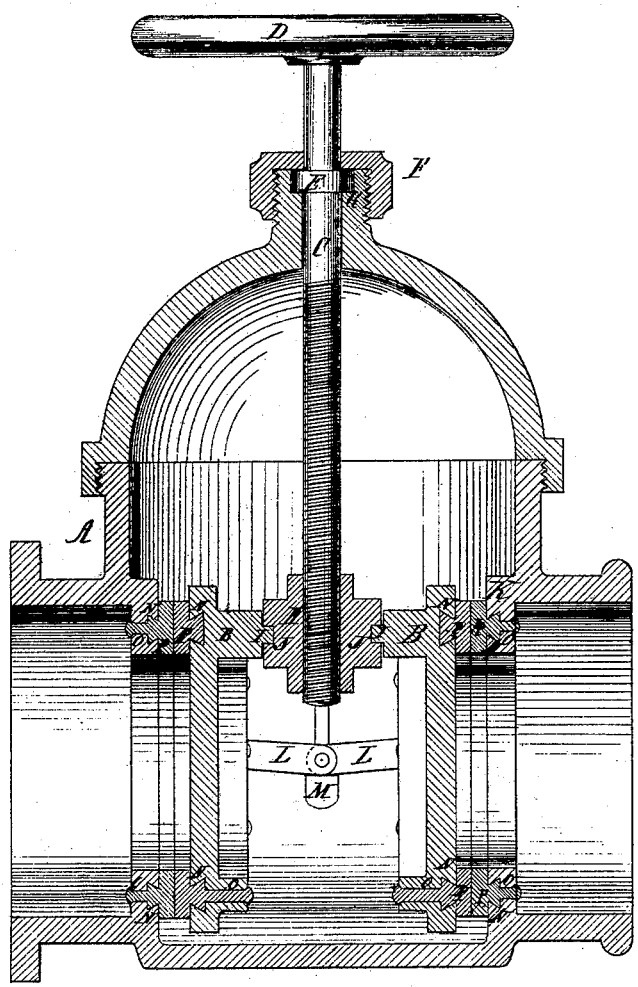
Figure 2:

Figure 1 represents a vertical section of my invention. Fig. 2 is a cross-section of a valve-disk containing my improvement.

Similar letters indicate corresponding parts.

This invention relates to steam and other valves and to valve-seats; and the same consists in forming the faces of valves and valve-seats of suitable soft metal, such as brass or Babbitt metal, to form a good wearing-surface, by casting such faces upon cast-iron valves and seats having grooves and rivet-holes, to form a secure fastening between the two metals. In this example my invention is applied to a stop-valve.

The letter A designates a valve-box, and B B valve plates or disks, which are raised and lowered by the valve-stem C. This valve-stem extends through the cap of the valve-box, and is turned by its hand-wheel D, the stem being made with a collar, E, which is held down by the stuffing-box F in a recess, G, formed for it in the top of the cap. The lower part of the stem has a screw-thread formed upon it, which works through a collar, H, having within it a corresponding screw-thread.

The collar H is secured between the top of the disks B B by means of pivotal studs I I, which enter sockets J J formed in the outer sides of the collar, the connection being such that the disks and the collar are free to turn upon each other.

When the stem is turned in the proper direction the disks are pushed down, so as to bring them opposite the valve-seats K, when they are forced against said seats by means of toggle-levers L L, a pair of which is pivoted to the disks on opposite sides, although but one pair is shown in the drawing.

When the toggle-levers are straightened the disks are forced asunder and pressed against their seats, and this is accomplished by the descent of the disks, whereby the toggle-joints are brought in contact with the stops M, (only one of which is shown in the drawing,) that project from the sides of the valve-box.

The disks and the valve-box are made of cast-iron, and I provide the disks and those parts of the valve-box which form the valve-seats with faces of soft metal by casting such faces on them, securing the soft metal in place by means of dovetailed grooves and rivet-holes, as will be next described.

The letter N designates dovetailed grooves formed in the outer surfaces of the disks and the valve-seats around their edges, and from the bottom of the grooves I make rivet-holes O, one or more for each groove. Upon the disks and the valve-seats thus prepared I cast soft-metal faces P, to form wearing-surfaces for the disks and seats, said faces becoming firmly secured to them by means of the said dovetailed grooves and rivet-holes, into which the soft metal flows in casting, and thereby a secure fastening is effected between the faces and the disks and seats.

What I claim as new, and desire to secure by Letters Patent, is—

The soft-metal faces P, in combination with the rivet-holes O and grooves N, substantially as described.

This specification signed by me this 31st day of January, 1870.

ROBERT SAFELY.

Witnesses:
C. WAHLERS,
E. F. KASTENHUBER.